(No Model.)  5 Sheets—Sheet 1.

F. H. RICHARDS.
WEIGHING MACHINE.

No. 585,970.  Patented July 6, 1897.

Witnesses:
J. L. Edwards Jr.
Fred. J. Dole.

Inventor:
F. H. Richards.

(No Model.)

F. H. RICHARDS.
WEIGHING MACHINE.

No. 585,970. Patented July 6, 1897.

Witnesses:
J. L. Edwards Jr.
Fred. J. Dole.

Inventor:
F. H. Richards.

(No Model.)

F. H. RICHARDS.
WEIGHING MACHINE.

No. 585,970. Patented July 6, 1897.

Witnesses:
J. L. Edwards Jr.
Fred J. Dole.

Inventor:
F. H. Richards.

(No Model.)  F. H. RICHARDS.  5 Sheets—Sheet 4.
WEIGHING MACHINE.
No. 585,970.  Patented July 6, 1897.

Witnesses:
J. L. Edwards Jr.
Fred. J. Dole.

Inventor:
F. H. Richards.

(No Model.)  5 Sheets—Sheet 5.

F. H. RICHARDS.
WEIGHING MACHINE.

No. 585,970.  Patented July 6, 1897.

Witnesses:
J. L. Edwards Jr.
Fred. J. Dole.

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,970, dated July 6, 1897.

Application filed December 15, 1896. Serial No. 615,730. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an efficient machine of this character more especially adapted for weighing granular and other free-flowing materials in relatively large quantities or loads, and it is in the nature of an improvement upon the invention set forth by my concurrently-pending application, Serial No. 613,009, filed November 21, 1896.

Figure 1:
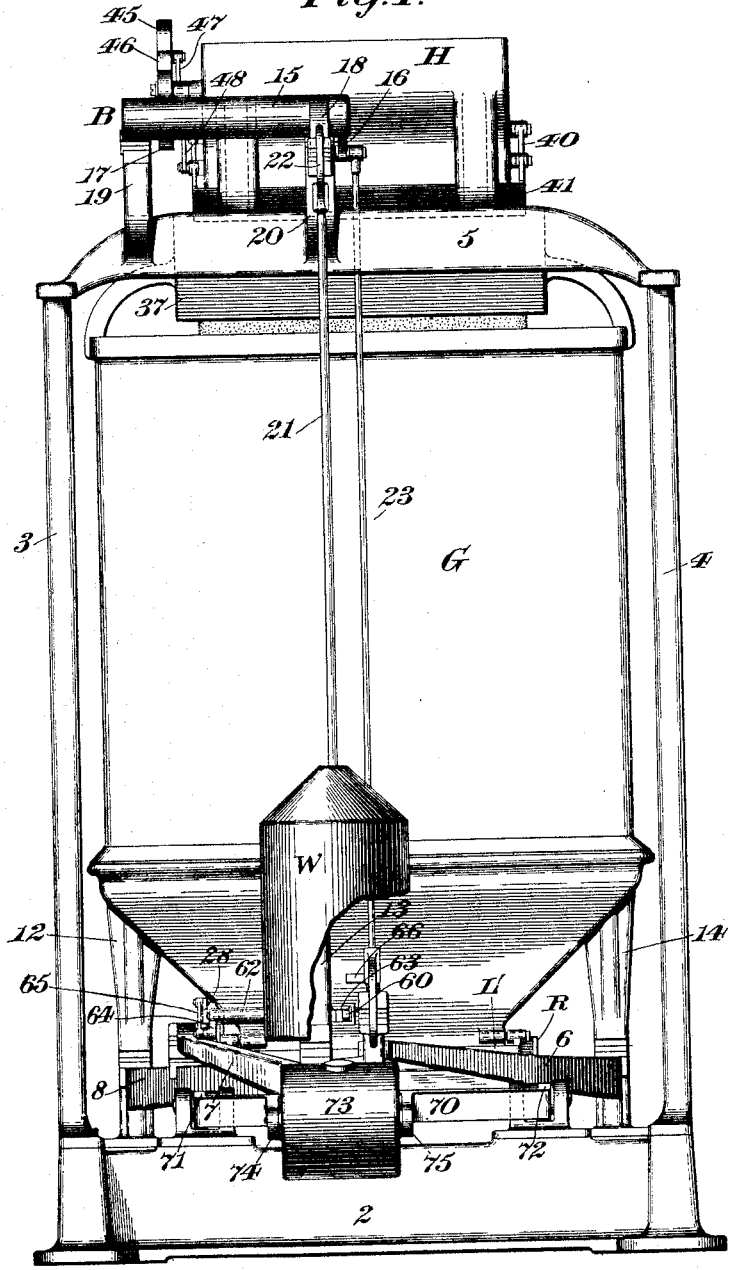
Figure 2:
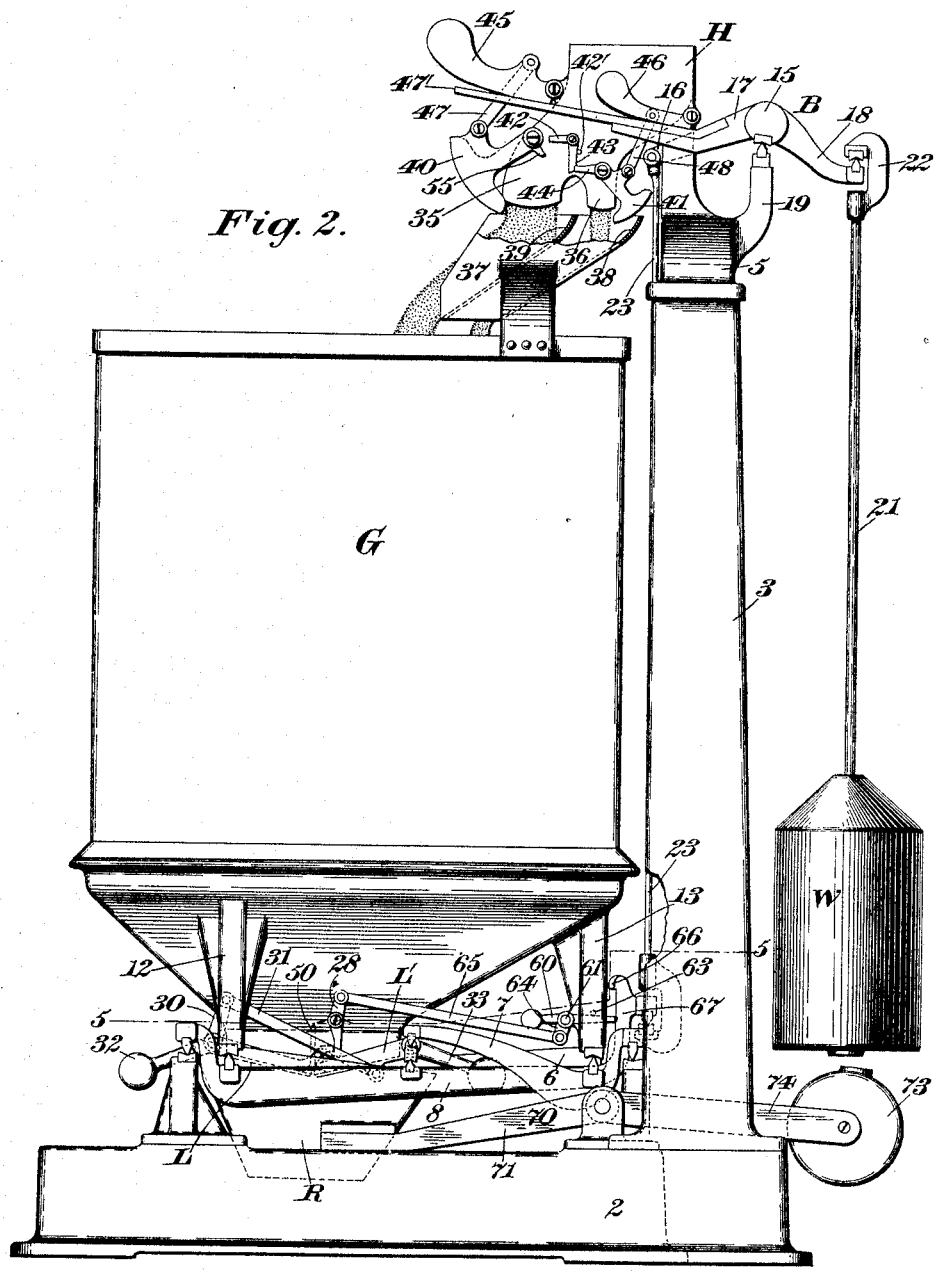
Figure 3:
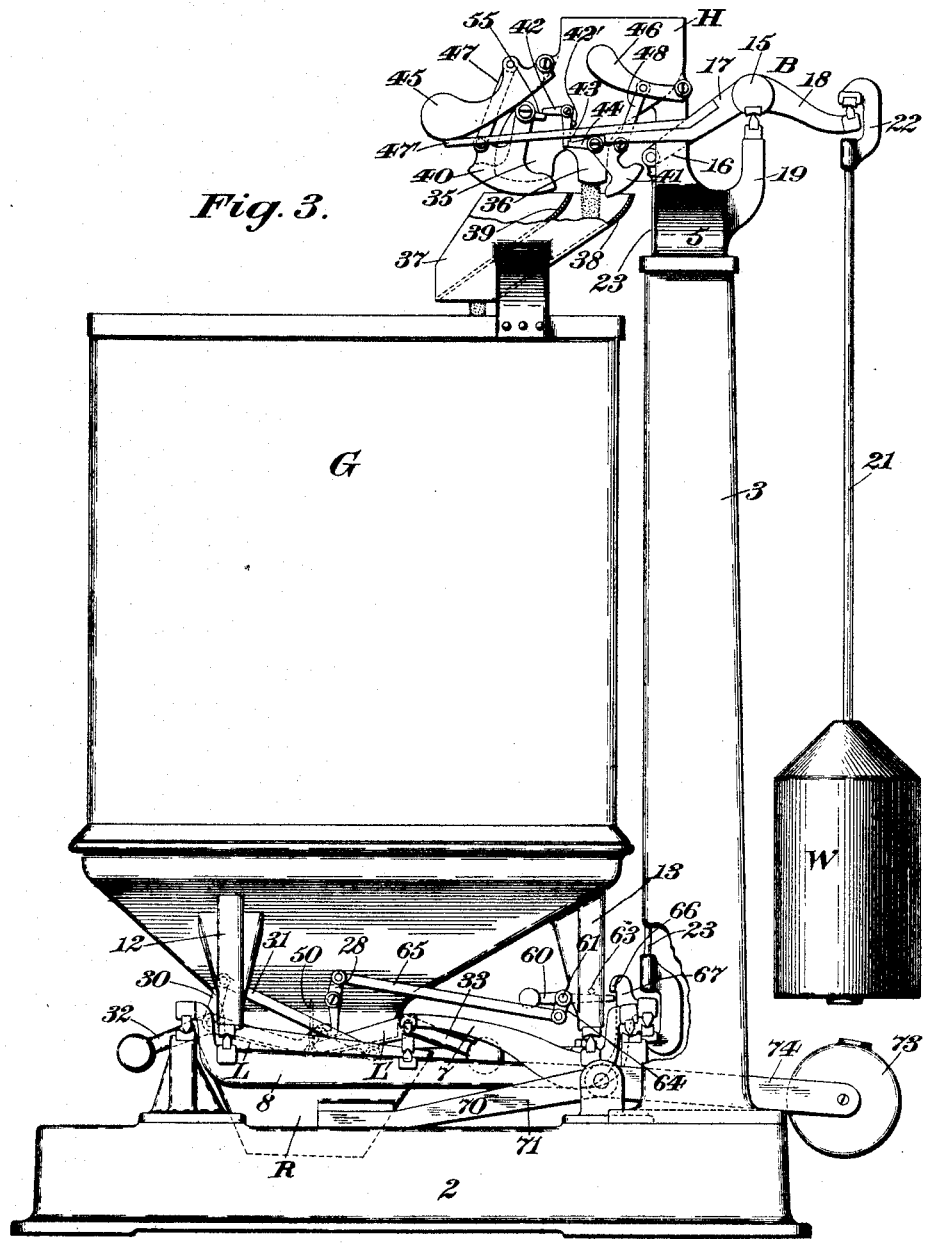
Figure 4:
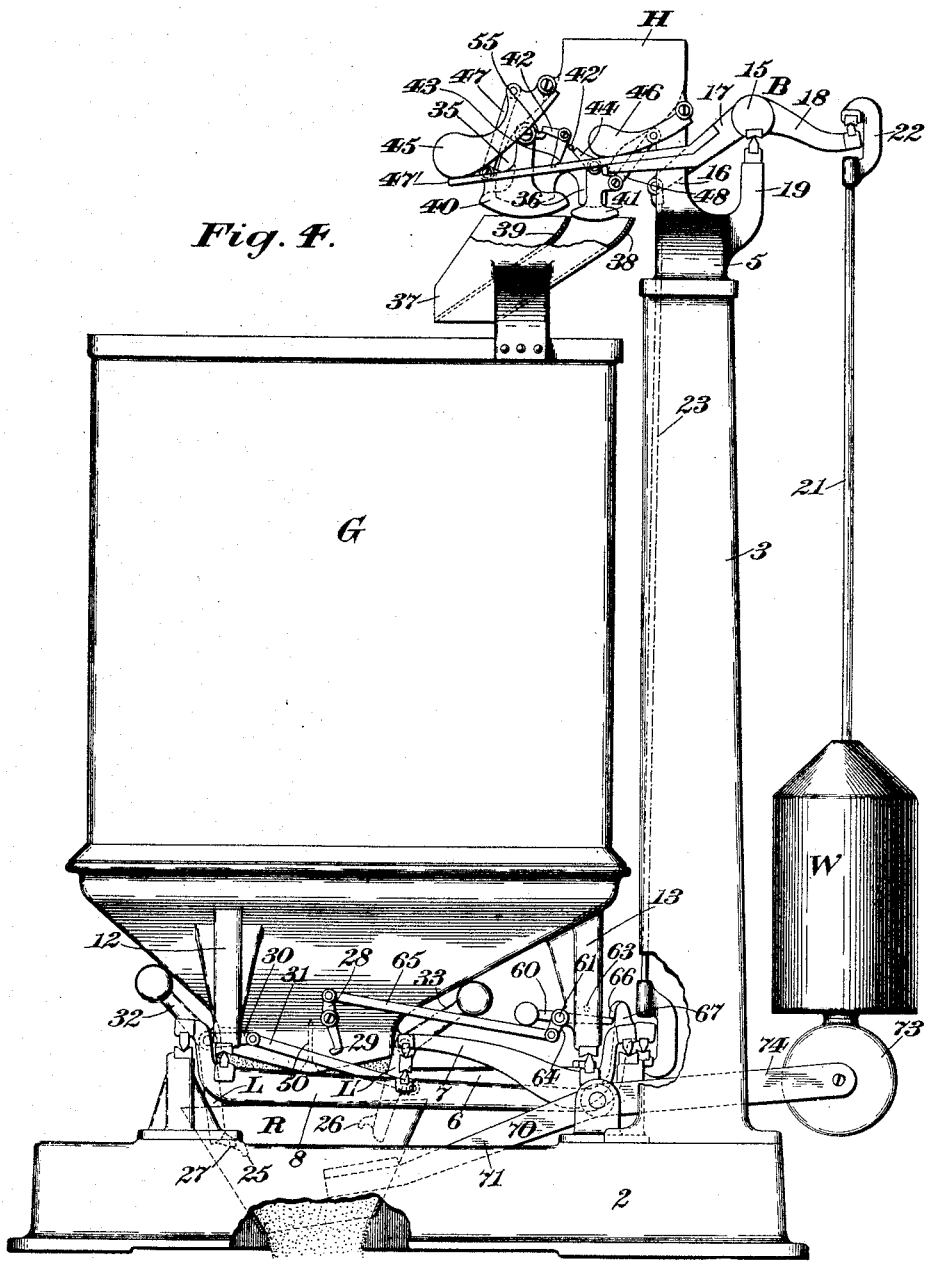
Figure 5:
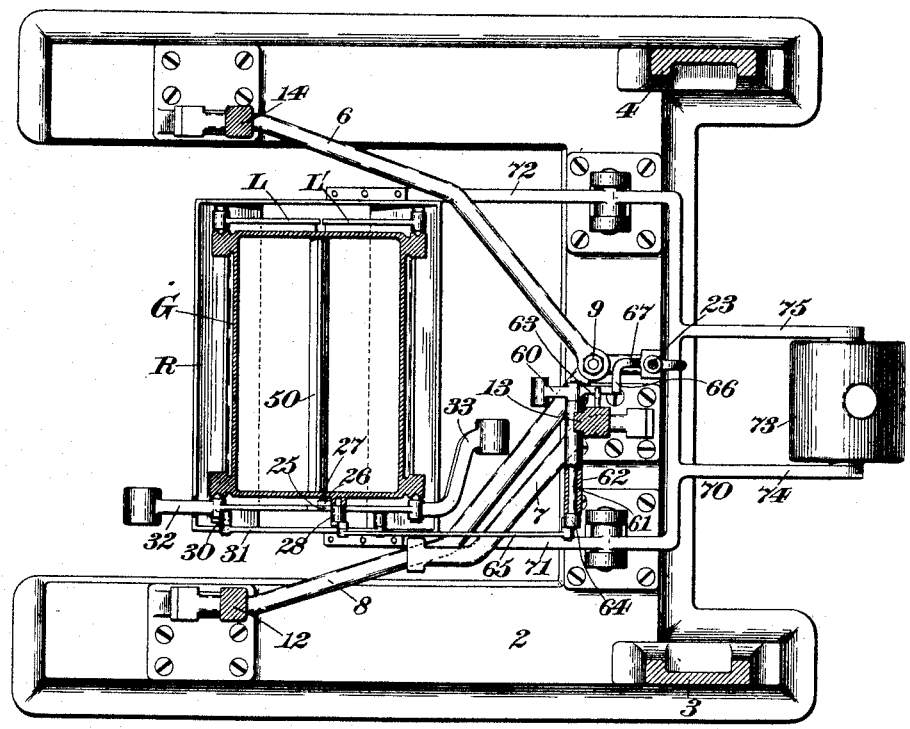
Figure 6:
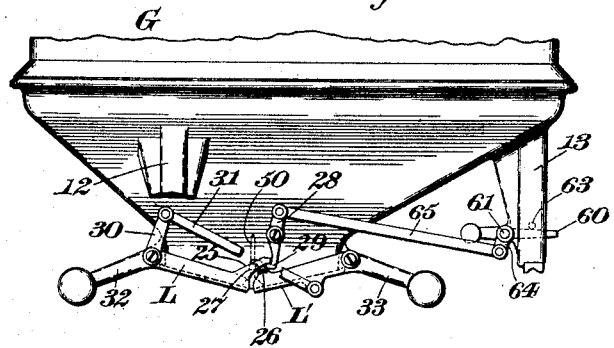

In the drawings accompanying and forming part of this specification, Figure 1 is a rear elevation of a weighing-machine embodying my present improvements. Figs. 2, 3, and 4 are end elevations as seen from the left in Fig. 1 and illustrating the machine at different stages in its operation. Fig. 5 is a sectional plan view, the section being taken in line 5 5, Fig. 2; and Fig. 6 is a detail view in elevation and illustrates more particularly the closer mechanism.

Similar characters designate like parts in all the figures of the drawings.

The framework for sustaining the various sets of mechanisms may be of any suitable structure, it consisting in the present case of the base or bed 2, the end frames or standards 3 and 4, and the top plate 5, said parts being connected together and said top plate being equipped with a hopper or chute H, which is of the "duplex" type and which constitutes a convenient means for delivering the supply to the load-receiver of the weighing mechanism.

The weighing mechanism includes a load-receiver and beam mechanism therefor, said load-receiver consisting in the present case of a single-chambered bucket G of relatively large capacity.

The beam mechanism is made up of two independently-operative systems, one of which includes a plurality of beams for carrying the bucket, the other comprising but a single beam, which is counterweighted.

The bucket-carrying beams are three in number and are fulcrumed upon the base or bed 2 in the usual manner and are joined to one another for coöperation, they being furnished with equidistantly-disposed supports, such as knife-edges, for the bucket. The bucket-carrying beams are designated by 6, 7, and 8, the beams 6 and 8 being connected to each other by the bolt 9. The reduced portion of the bucket is furnished with a series of depending arms 12, 13, and 14, triangularly disposed, and each being furnished with notched bearings at their lower ends, resting upon coöperating knife-edges or bucket-supports on the three beams 6, 7, and 8.

The counterweighted scale-beam is designated by B, and it consists of a shaft 15, the arms 16 and 17, extending forwardly therefrom, and the oppositely-disposed weight-carrying arm 18, said shaft having at its opposite ends notched bearings which are borne by pivots or knife-edges on the brackets 19 and 20 of the top plate 5.

A relatively long rod is shown at 21, it being suspended from the beam-arm 18, said rod having at its upper end the hook 22, carrying a notched bearing resting upon a coöperating knife-edge of the beam-arm 18. The rod 21 is provided at its lower end with the counterweight W.

For obtaining a movement of the respective beams in synchronism I provide the longitudinal rod 23, which is pivoted to the beam-arm 16 and is connected to the bucket-carrying beam 8 by a knife-edge and notched-bearing joint.

The bucket G will have at its lower end the usual discharge-outlet, and for controlling the passage of material therefrom I prefer to employ a plurality of closers which are interlocked, the interlocking portions of the closers being separable, and in the present case they are represented adjacent to the discharge edges of said closers and as rigid or integral therewith.

The closers for the bucket are designated by L and L', respectively, and they are pivotally supported at opposite sides of the discharge-outlet of the bucket and are in the form of flat plates fitting against the oppositely-disposed beveled portions of the bucket when shut.

Means are furnished for holding one of the closers shut, the same consisting of a suitable latch adapted to engage one of them, and by reason of the interlock between said members the companion closer will be also held shut.

The closers are furnished with the coöperative lugs 25 and 26, the last-mentioned being bent or curved and being located to engage over the pin or stud 27 on the lug 25 when said closers are in their normal positions.

A closer-latch is illustrated at 28, it being pivotally connected to the bucket and having at its lower or free end the catch or toe 29, which is adapted to engage the adjacent lug 25 of the closer L when the latter is in its shut position, as represented in Fig. 6, so that, the bent lug 26 being in engagement with the pin 27, the closer L' will be held against opening movement, and by swinging the latch laterally sufficiently far to disengage it from the lug 25 the release of the two closers L and L' will follow, so that they can be forced apart by the weight of the contents within the bucket.

Means are provided for obtaining a shutting movement of the closer L' slightly in advance of that of the closer L, whereby the locking-lug 26 may be caused to properly engage over the projecting stop-pin 27 of the lug 25.

A crank-arm is illustrated at 30 movable concentric with the closer L and having at its outer end the link 31, pivoted thereto and also to the closer L' about midway thereof, whereby the result thus specified will be assured.

To return the closers to their shut positions, I provide the oppositely-disposed arms 32 and 33, which may be cast integral with the closers L and L', respectively.

To prevent material from crowding between the discharge edges of the two closers as they shut, such edges do not meet, but a slight space will be left between them, and for the purpose of precluding waste of the material during the weighing operation I locate within the bucket a guard 50, which consists of a longitudinal plate vertically disposed therein, it being attached to the opposite inside faces of the bucket in some convenient manner.

The guard is widened out at its base, such base having oppositely-inclined or oblique faces, while the apex of the guard is sharpened to permit the ready passage of material through the bucket, such widened base being located immediately over the space between the two closers.

The stream-supplying means for the bucket includes the chute or hopper H, to which I have hereinbefore referred, and which has the two spouts 35 and 36 for the delivery, respectively, of main and drip streams, which flow simultaneously into the bucket for a certain period of time. The main stream, which is of relatively large volume, will be cut off at the commencement of the poising period, the load being finished by the drip-stream, the passage of which to the bucket is stopped on the completion of a predetermined charge.

There is illustrated at 37, carried by the bucket G, a supply-delivery device consisting of a series of superposed plates 38 and 39, located, respectively, below the drip and main stream spouts 36 and 35 of the hopper H, said plates being inclined to deliver the two streams into the bucket to build up the load therein.

The main-stream controller or valve is designated by 40 and the auxiliary or drip-stream controller or valve is designated by 41, they being of "oscillatory" type and movable below the orifices of the spouts 35 and 36 to permit or prevent the passage of the supply to the bucket, said valves being of well-known construction and pivoted to the hopper H.

The valve 41 will be normally maintained in its wide-open position to permit the unobstructed passage of the drip-stream into the bucket, and for thus maintaining the valve I provide the swinging detent or catch 42, which is pivoted to the hopper H, and the vertical arm of which is furnished with a shoulder 43, against which the arm 44 of the valve 41 is adapted to abut, it being evident that when the detent 42 is tripped at the proper stage in the operation said valve can be closed.

To close the valves, I provide the actuators 45 and 46, consisting of counterweighted arms pivotally mounted on the hopper H and connected to the valves by the links 47 and 48, respectively.

The beam-arm 17, to which I have hereinbefore referred, is furnished with a forwardly-disposed stop-rod 47', which may be attached thereto, and with which the curved under faces of the two valve-actuators 45 and 46 are adapted to come in contact, so that as the rod 47' descends with the bucket G during the making of a load the valve-actuator 45 may drop in correspondence therewith, whereby it can, through the interposed link 47, shut the valve 40 to cut off the main stream, which emerges from the spout 35. As said rod thus descends, the actuator 46 will not move therewith, (see Fig. 3,) as it is held by the detent 42, which is in engagement with the valve-arm 44. When, however, said detent is tripped and the valve is released, the actuator 46 may drop against the stop-rod 47' to instantly shut the auxiliary valve. The detent 42 is a gravity-detent, it being kept in its normal position by the pin 42' on the hopper.

On the completion of a load the curved faces of the two actuators 45 and 46 will be contiguous to the stop-rod 47', which constitutes a valve-opening actuator, so that as the latter rises with the empty bucket the two actuators 45 and 46 will be elevated, thereby simultaneously opening the valves 40 and 41 through the intermediate links 47 and 48, although said valves are successively closed.

The tripping device for the detent 42 is designated by 55, and it consists of a fixed projection on the main valve 40, which, at a point subsequent to the cut-off of the main stream, is adapted to impinge against the horizontal arm of said detent, thereby lifting said arm and swinging the vertical arm thereof to the left sufficiently far to disengage it from the fixed arm 44 of the auxiliary valve 41, so that said valve is released and can be promptly shut by the dropping of the weight 46 from the position shown in Fig. 3 to that illustrated in Fig. 4.

I provide an actuator for the closer-latch 28, which is operative to maintain said latch in its effective position and to also return it thereto when operated, said latch being preferably tripped by a pressure applied to said actuator and by means operative with the weighing mechanism.

The latch-actuator is designated by 60, and it consists of a counterweighted lever fixed to the short shaft 61, which is carried by a longitudinal sleeve 62 on the bracket 13, that depends from the bucket, the action of said lever being properly limited by a stop-pin 63 on the bracket. The shaft 61 is furnished at its outer end with a short crank-arm 64, to which is pivoted the link 65, said link being likewise connected to the upper arm of the closer-latch 28.

The latch-tripping device consists of the lateral hook or projection 66 on the vertical post 67 of the bucket-carrying beam 8, which at the close of the weighing operation is designed to engage and slightly depress the free arm of the counterweighted actuating-lever 60, thereby, through the shaft 60, crank-arm 64, and link 65, swinging the working arm of the latch 28 outward, whereby it is disengaged from the coöperating lug 25 of the closer L. When the tripping device 66 leaves the lever 60 on the rise of the bucket G, said lever and latch will be returned to the initial positions thereof by the action of the counterweight of said lever.

In connection with the bucket and its counterweighted scale-beam I provide means, operated by the discharge of a load, to uphold said scale-beam, and to consequently retard the ascending movement of the emptying bucket.

There is shown at R, located below the bucket G for reciprocatory movement, a regulator in the form of a hopper, its carrier being designated by 70, said carrier consisting of a frame, the longitudinal sections 71 and 72 of which are pivotally supported between ears or risers on the base 2 and are suitably attached to the opposite ends of the regulator. The regulator is also counterweighted, it being furnished with the counterweight 73, suitably supported between the sections 74 and 75 of the regulator carrier or frame 70.

On the discharge of a load by the bucket the regulator will receive the same and will be depressed thereby, the carrier or frame thereof on the opposite side of the axis of movement being elevated, so that the counterweight 73 will be carried against the weight W of the scale-beam B, which weight W has reached the limit of its upstroke, to thereby uphold the said weight. (See Fig. 4.)

The regulator-hopper R confines the mass which is discharged from the bucket, as shown in Fig. 4, whereby the material acting against the closers L and L' will hold the same wide open, to thereby permit the complete load to pass from the bucket.

When the material has passed below the discharge edges of the two closers, they can be returned to their shut positions by the action of the counterweighted arms 32 and 33, and when the substance has been emptied from the regulator the latter can be elevated by the falling of the counterweight 73 thereof, whereby the bucket and beam B may freely rise and the weight W of said beam drop.

The operation of the hereinbefore-described machine, briefly stated, is as follows: Fig. 2 represents the positions occupied by the respective parts at the commencement of operation, the valves 40 and 41 being in their wide-open positions and the valve 41 being held against closure by the detent 42, which is in engagement with the fixed arm 44 of said valve. The closers L and L' being shut and held in such position, the two streams will flow from the spouts 35 and 36 and after passing over the plates 38 and 39 will enter the bucket. When a certain proportion of the load has been received by the bucket, it, with the several beams, including the beam B, will descend, so that the stop-rod 47' by falling away from the counterweighted valve-actuator 45 will permit the closure of the valve 40 by said actuator through the intermediate link 47. At the commencement of the poising or drip period, as represented in Fig. 3, the main valve 40 will have cut off the main supply, the load being nearly complete, although the drip-valve 41 is still open to permit the drip stream to be delivered to the bucket for finishing the load. On the completion of a load the rod 47' will continue to move away from the actuator 45 and the valve 40 will be closed farther and until the tripper or projection 55 is carried against the horizontal arm of the detent 42, thereby lifting said arm and rocking the vertical arm of said detent to the left until it is disengaged from the fixed arm 44 of the auxiliary valve 41, so that said valve can be promptly shut by the dropping of the actuator 46, acting through the intermediate link 48. At this time the trip device 66 will be in contact with the free arm of the lever 60, whereby on a slight advancing movement of the weighing mechanism it will force said arm downward and swing the working arm of the latch 28, by reason of the intermediate connections, outward until it is disengaged from the lug 25 of the closer L, thereby freeing said closer and its companion L' from all restraint, so that they can be instantly opened by the weight of the load within the bucket. When the load has been fully discharged from the bucket, the two closers L and L' will be shut by the weighted arms 32 and 33, and the remaining parts of the machine will be then caused to return to their initial positions.

Having described my invention, I claim—

1. The combination, with beam mechanism, of a load-receiver supported thereby and having a discharge-outlet; a series of closers for the discharge-outlet, connected with the load-receiver and having interlocking stop-faces located outside of the discharge-outlet and engaging each other when the respective closers are shut, said interlocking portions being disengaged on the opening of the closers; a crank-arm on one of the closers; and a link pivoted to the closer between its axis of movement and discharge edge, respectively, and also pivoted to said crank-arm and means for locking and unlocking the closers.

2. The combination, with a reciprocatory weighing-bucket having a discharge-outlet and with beam mechanism for supporting said bucket; of a series of closers for said outlet, connected with the bucket and each having a lug, one of said lugs being bent and adapted to engage over a pin on the other lug; a crank-arm secured to one of said closers; a link pivoted to the other closer, at a point between its ends, and also pivoted to said crank-arm; a latch mounted on the bucket, to engage one of the closers; a latch-actuator connected with said latch; and a tripping device on the beam mechanism, for operating the latch-actuator at a predetermined time.

3. The combination, with a load-receiver and with a scale-beam, of a chute having a series of spouts, each of which is provided with a valve; actuators for said valves, connected thereto by links; a stop on the scale-beam, coöperative with said valve-actuators; a detent normally operative for maintaining one of the valves in its open position; and a detent-tripping device connected with the other valve.

4. The combination, with a load-receiver and with a scale-beam therefor, of a chute having a series of spouts for delivering material to the load-receiver; valves one for each of said spouts; valve-actuators connected to the valves by links; a detent normally operative for maintaining one of said valves in its open position; a detent-tripping device operative with the other valve; and a stop on the scale-beam, coöperative with the valve-actuators.

5. The combination, with a load-receiver and with a scale-beam therefor, of a chute having a series of spouts; valves, one for each of said spouts; valve-actuators; a detent located to engage a fixed arm on one of the valves; and a detent-tripping device operative with the other valve.

6. The combination, with a load-receiver having a series of stream-delivery plates and with a scale-beam, of a chute having a plurality of spouts located to deliver their streams to said plates; valves, one for each of said spouts; valve-actuators; a detent located to engage an arm on one of the valves; a detent-tripping device connected to the other valve; and a stop on the scale-beam, coöperative with the valve-actuators.

FRANCIS H. RICHARDS.

Witnesses:
FRED. J. DOLE,
E. C. WHITNEY.